Feb. 6, 1962     E. W. MARSH     3,019,859
VEHICLE BRAKING MECHANISM WITH
CLEARANCE ADJUSTING MEANS
Filed May 26, 1959
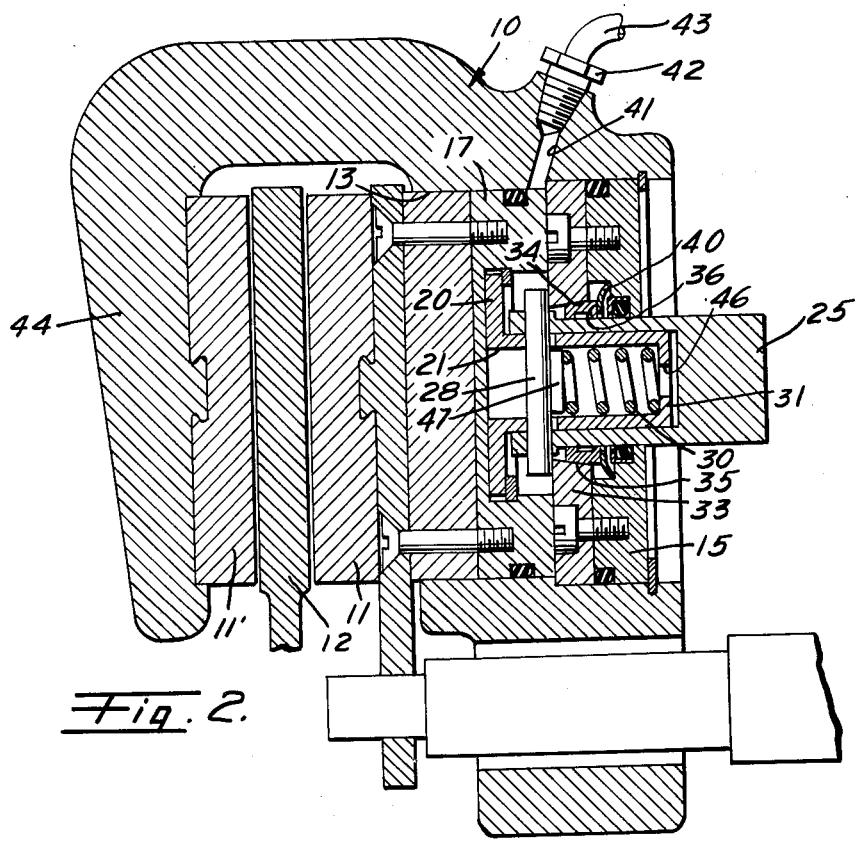
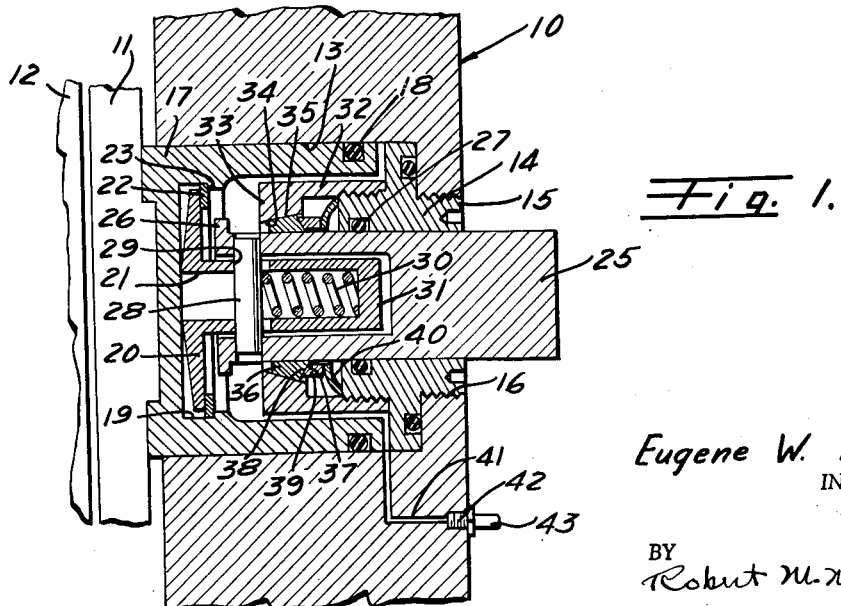
Eugene W. Marsh,
INVENTOR.
BY Robert M. McManigal
Attorney United States Patent Office 3,019,859
Patented Feb. 6, 1962

3,019,859
VEHICLE BRAKING MECHANISM WITH CLEARANCE ADJUSTING MEANS
Eugene W. Marsh, Van Nuys, Calif., assignor to Airheart Products Inc., Van Nuys, Calif., a corporation of California
Filed May 26, 1959, Ser. No. 815,926
5 Claims. (Cl. 188—72)

The present invention relates generally to brake actuating mechanisms for wheeled vehicles, and is more particularly concerned with means for automatically compensating for brake wear, and for adjusting brake release clearance.

The present invention constitutes an improvement in the braking mechanism disclosed in the application of Toby T. Cagle, Serial No. 136,013, filed December 30, 1949, now abandoned.

In its broad concept, the present invention is similar to that disclosed in the above noted application in that it comprises power means for actuating the brake elements, the power means embodying a cylinder within which there is mounted a main piston, and an auxiliary piston which is interconnected to a stud carried by the main piston by lost motion connection which is so arranged that during normal operation the main piston is confined to reciprocable movement between predetermined limits which constitute the brake clearance space when the brake is in release position. In addition, a holding device is incorporated in the mechanism which is arranged to release the auxiliary piston for movement beyond the predetermined limits when a predetermined holding force of the device is exceeded. Thus the braking elements are actuated within the predetermined limits or clearance space until such time as the brake wear becomes so great that the brake will not set up tightly within the predetermined limits of movement. Under such conditions, the actuating pressure applied to the main piston causes relative movement beyond the predetermined limits as a result of exerting a force which is greater than that of the friction holding device opposing movement of the auxiliary piston. Upon release of the brake, the main piston is withdrawn by spring means which is operative within the predetermined limits of movement of the connection between the pistons.

It is one object of the present invention to simplify the interconnection between the pistons, for providing the limited lost motion connection, so that the braking mechanism may be more economically produced.

Another object is to provide simplified friction means having a less number of coacting parts, and which is more simple of operation, to the end that longer life may be obtained for the braking mechanism.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a diametral section taken through a brake actuating mechanism embodying the features of the present invention, certain parts being shown in elevation for clearness; and FIG. 2 is a similar view of a modified structure embodying the invention, and illustrating the manner in which a single actuating mechanism may be utilized for controlling braking members on opposite sides of a rotatable disk.

Referring now generally to the accompanying drawings, for illustrative purposes, the present invention is shown as embodying a body structure, as generally indicated by the numeral 10, which houses the brake actuating mechanism for moving an associated brake shoe 11 into and out of engagement with a brake drum 12 or other conventional braking element as may be associated with the vehicle wheel, and against which the braking forces are adapted to be applied.

The body structure 10 is formed with a cylindrical bore 13 which provides a cylinder of the operating mechanism for the brakes. This cylindrical bore is open at one end, and closed at the opposite end by means of head bushing 14 having an outer end 15 adapted to threadedly engage a wall opening 16 formed at this end of the cylindrical bore.

Within the cylindrical bore 13, there is positioned a main piston 17 of generally cup-shaped construction, this piston having its bottom portion arranged to engage with the brake shoe 11, and being provided on its peripheral surface with a recessed O-ring 18 adapted to make sealing engagement with the cylinder wall.

Internally, the main piston has a circumferentially extending groove 19 adjacent the bottom of the piston. This groove is adapted to receive therein the periphery of a disc-shaped head portion 20 of a hollow axially projecting stud member 21. The head portion is retained by means of the snap ring 22 which abuts a shoulder 23 of the retaining groove.

There is also mounted in the cylindrical bore 13 an auxiliary piston 25 of cup-shaped construction, this auxiliary piston having its outer end closed and its inner end open and formed with a radially projecting rim flange 26. The auxiliary piston is supported for reciprocable axial movement within the head bushing 14, this bushing having a recessed O-ring 27 for making sealing engagement with the outer surface of the auxiliary piston.

As thus mounted, the hollow stud member 21 extends axially into the interior of the auxiliary piston through its inner open end, and the auxiliary piston is connected with the stud member so as to provide limited relative movement, as will now be explained. For this purpose, a diametrically extending transverse pin 28 is mounted with its ends fixedly supported in the concentrically extending wall of the auxiliary piston. This pin extends through the wall of the inner positioned stud member 21 through diametrically aligned openings 29—29, these openings being of larger diameter than the diameter of the pin so as to provide a lost motion clearance corresponding with the designed brake release clearance. A compression spring 30 is housed within the hollow stud member 21, one end of this spring bearing against the pin 28, while the opposite end of the pin bears against a closed end 31 of the stud member. As thus arranged, the spring 30 normally acts to bias the main piston 17 in a direction which will move the brake shoe to released or non-braking position, with the pin 28 engaging the side of the opening 29 on the side of the head portion 20 of the stud member. In other words, the spring 30 biases the main piston and auxiliary piston axially in directions towards each other.

In addition to the connection just described, which permits limited relative movement between the stud member 21 and the auxiliary piston 25, a holding device is provided for holding the auxiliary piston against axial movement, when there is a tendency to exceed the limited movement of the main piston as established by the movement of the pin 28 within the openings 29—29.

The holding device is shown as being positioned within a tubular projection 32 which is secured at one end to the head bushing 14 and concentrically surrounds the auxiliary piston. As shown, the other end of the tubular projection 32 is constructed with an internal end flange 33 which carries on its inner periphery a bevelled surface 34 for engaging with a coacting surface 35 formed on a grip ring 36 having wedging relation with the auxiliary piston.

The grip ring 36 is also provided with a second bevelled or inclined surface 37, this surface being inclined at a different angle than the surface 35, and being arranged to coact with a bevelled surface 38 formed upon a ring member 39.

The ring member 39 is spring loaded by means of a spring washer 40 which biases the ring 39 and the grip ring 36 inwardly or to the left as viewed in FIG. 1. By inclining the surfaces 35 and 37 of the grip member at different angles, it is possible to regulate the frictional pressure which will be applied in one direction of the movement of the auxiliary piston and obtain a different frictional pressure in an opposite direction of movement of the auxiliary piston. As shown, the inclined surfaces are so chosen that a greater frictional pressure will oppose movement of the auxiliary piston inwardly, than the pressure which opposes movement of the auxiliary piston in an outward direction.

Provision is made for supplying an operating fluid through a passage 41 into the cylinder for operating the pistons and actuating the braking elements. This passage is brought out through a connection fitting 42 which may be connected with a suitable conduit 43 for conducting an actuating fluid under pressure from a suitable source to the brake actuating mechanism.

Briefly, the operation of the brake mechanism described above will be as follows: As shown in FIG. 1, the brake shoe 11 is in non-braking position and is spaced from the brake element 12 a distance which constitutes the brake release clearance as determined by the clearance of the openings 29 with respect to the pin 28. So long as this clearance is not exceeded, the main piston will be moved in a brake setting direction when operating fluid is supplied to the cylinder. Upon release of the fluid pressure, the main piston is moved in the opposite direction or released direction by the action of the spring 30. During this operation there will be no movement of the auxiliary piston 25.

Let it now be considered that the brake shoe has been worn sufficiently that there will not be enough clearance between the pin 28 and the periphery of the openings 29 to permit the brake shoe to effectively engage the braking element, when operating fluid is admitted into the cylinder. Under such circumstances, the main piston will be moved within the limits of the openings 29, until the pin 18 engages the opposite side of the opening. Up to this point, the holding device will frictionally oppose movement of the auxiliary piston. However, as soon as the lost motion is taken up, the main piston will act to apply a force directly against the auxiliary piston, and as soon as this pulling force exceeds the frictional force or drag on the auxiliary piston by virtue of the holding device, the auxiliary piston will be moved in unison with the main piston and a full braking effect obtained against the braking element. Thus, the auxiliary piston will be moved inwardly so as to compensate for the wear of the brake shoe, and the position of the auxiliary piston as viewed from its projecting exposed outer end will serve as a visual indicator of the amount of wear on the brake shoe.

When the pressure of the fluid within the piston is released, the spring 30 will act in the same manner as before to withdraw the brake shoe a distance corresponding with the built-in clearance as established by the space in the openings 29 surrounding the pin 28.

The operations just described are the usual normal operating conditions. However, a different operating condition may prevail where, for example, the brake shoe 11 is in engagement with the braking element 12, when the main piston is in brake releasing position. Such a condition may exist in the event that a new braking shoe has been installed. When fluid pressure is applied in the cylinder, this pressure cannot cause movement of the main piston because the brake shoe is already against the braking element 12. It will be apparent that if the brake shoe clearance is not readjusted, the brake shoe cannot move away from the braking element 12 when the actuating pressure is released. Thus, under said circumstances, when the actuating pressure is applied to the cylinder, and since the main piston cannot move in a brake setting direction, this pressure will act to move the auxiliary piston outwardly until the clearance is reestablished. During this movement, the holding device opposes the movement of the auxiliary piston with less frictional force than that which opposes movement of the auxiliary piston in the opposite direction. Thus the built-in clearance is automaically reestablished.

The arrangement shown in FIG. 2 of the drawings constitutes a slightly modified arrangement, but operates on the same general basic principles inherent in the devices previously described. In the modified structure, similar numerals have been utilized to indicate the various elements which correspond to those embodied in the arrangement described and shown in FIG. 1.

More specifically, the arrangement shown in FIG. 2 differs primarily in that the body structure 10 is modified to include a backing plate 44 which serves as a support for a stationary brake element 11'. Moreover, instead of utilizing a brake drum, the braking elements in this case coact with an annular brake ring 12' which is interposed between the braking elements.

The closed end 31 of the stud member 21 is in this case modified by having an axial end opening 46 therein to establish a communication passage between the opposite sides of the end 31 of the stud. An abutment plate or disc 47 is interposed between the pin 28 and the adjacent end of the spring 30.

It will also be noted that there is a slightly modified arrangement for the friction holding device in that the ring member 39 has been deleted, the spring washer 40 in this case acting directly upon the grip ring 36.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. Braking mechanism, comprising: cooperable braking elements mounted for relative movements into and out of engagement; a cylinder; a main piston for actuating one of said braking elements; a hollow axially extending stud member carried by said main piston; a tubular auxiliary piston of less active area than the main piston surrounding and in telescoped relation to said stud member; a diametrical transverse pin carried by said auxiliary piston extending through diametrically aligned openings in said stud, said openings having diameters larger than the pin diameter; a compression spring in said stud having one end bearing against said pin and its other end against an outer end portion of said stud; means for applying a fluid pressure to said pistons to relatively move the pistons to the extent of the limited movement of the pin in said openings; and a holding device for releasing said auxiliary piston for movement in one direction when a predetermined holding force is exceeded, and for movement in an opposite direction when a different holding force is exceeded.

2. Braking mechanism, comprising: cooperable braking elements mounted for relative movements into and out of engagement; a cylinder; a main piston for actuating one of said braking elements; a hollow axially extending stud member carried by said main piston; a tubular auxiliary piston of less active area than the main piston surrounding and in telescoped relation to said stud member; a diametrical transverse pin having its ends fixedly supported in the wall of said auxiliary piston and extending through diametrically aligned openings in the wall of said hollow stud, said openings having diameters larger than the pin diameter; a compression spring wholly contained within the wall of said stud with one end bearing against said pin and its other end against an outer end portion of said stud; means for applying a fluid pressure to said pistons to relatively move the pistons to the extent of the limited movement of the pin in said openings; and a holding device for releasing said auxiliary piston for movement in one direction when a predetermined holding force is exceeded, and for movement in an opposite direction when a different holding force is exceeded.

3. Braking mechanism, comprising: cooperable braking elements mounted for relative movements into and out of engagement; a cylinder; a main piston for actuating one of said braking elements; a hollow axially extending stud member carried by said main piston; a tubular auxiliary piston of less active area than the main piston surrounding and in telescoped relation to said stud member; a diametrical transverse pin having its ends fixedly supported in the wall of said auxiliary piston and extending through a diametric opening in the wall of said hollow stud, said opening having a diameter larger than the pin diameter; a compression spring wholly contained within the wall of said stud with one end bearing against said pin and its other end against an outer end portion of said stud; means for applying a fluid pressure to said pistons to relatively move the pistons to the extent of the limited movement of the pin in said opening; and a holding device for releasing said auxiliary piston for movement in one direction when a predetermined holding force is exceeded, and for movement in an opposite direction when a different holding force is exceeded.

4. Braking mechanism, comprising: cooperable braking elements mounted for relative movements into and out of engagement; a cylinder; a main piston for actuating one of said braking elements; a hollow axially extending stud member carried by said main piston; a tubular auxiliary piston of less active area than the main piston surrounding and in telescoped relation to said stud member; a diametrical transverse pin carried by said auxiliary piston extending through diametrically aligned openings in said stud and having a lost motion connection providing limited relative movement between the auxiliary piston and said stud; a compression spring in said stud having one end bearing against said pin and its other end against an outer end portion of said stud; means for applying a fluid pressure to said pistons to relatively move the pistons to the extent of said limited relative movement; and a holding device for releasing said auxiliary piston for movement in one direction when a predetermined holding force is exceeded, and for movement in an opposite direction when a different holding force is exceeded.

5. Braking mechanism, comprising: cooperable braking elements mounted for relative movements into and out of engagement; a cylinder; a main piston for actuating one of said braking elements; a hollow axially extending stud member carried by said main piston; an auxiliary piston of less effective area than the main piston in telescoped relation with respect to said stud member; a diametrical transverse pin carried by and fixedly supported in said auxiliary piston, said pin having portions positioned in openings in said stud having diameters larger than the pin portions providing limited movement therein; a compression spring acting between said stud and said pin to force said pin portions against one side of said openings; means for applying a fluid pressure to said pistons to relatively move the pistons to the extent of said limited movement of the pin portions in said openings; and a holding device for releasing said auxiliary piston for movement in one direction when a predetermined holding force is exceeded, and for movement in an opposite direction when a different holding force is exceeded.

References Cited in the file of this patent

UNITED STATES PATENTS

| 2,551,252 | Du Bois | May 1, 1951 |
| 2,644,549 | Cagle | July 7, 1953 |
| 2,905,277 | Cagle | Sept. 22, 1959 |

FOREIGN PATENTS

| 514,571 | Great Britain | Nov. 13, 1939 |